United States Patent
Rajagopalan et al.

(10) Patent No.: US 7,756,509 B2
(45) Date of Patent: Jul. 13, 2010

(54) METHODS AND APPARATUS FOR PROVIDING AN ACCESS PROFILE SYSTEM ASSOCIATED WITH A BROADBAND WIRELESS ACCESS NETWORK

(75) Inventors: Bala Rajagopalan, Beaverton, OR (US); Sanjay Bakshi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 11/394,492

(22) Filed: Mar. 31, 2006

(65) Prior Publication Data

US 2007/0237093 A1    Oct. 11, 2007

(51) Int. Cl.
    *H04M 1/66*     (2006.01)
    *H04M 1/68*     (2006.01)
    *H04M 3/16*     (2006.01)

(52) U.S. Cl. .................. 455/411; 455/410; 455/418; 455/419; 455/420; 713/160; 713/161; 713/162; 713/163; 713/164; 713/165; 713/166; 713/167; 713/168; 713/169; 713/170; 713/171; 713/172; 713/173; 713/174; 713/175; 713/176; 713/177; 713/178; 713/179; 713/181; 713/182

(58) Field of Classification Search ............... 455/410, 455/411, 418, 419, 420
See application file for complete search history.

(56) References Cited

U.S. PATENT DOCUMENTS

| | | | | |
|---|---|---|---|---|
| 7,286,848 | B2* | 10/2007 | Vireday et al. | 455/550.1 |
| 7,363,354 | B2* | 4/2008 | Lahti | 709/219 |
| 7,477,632 | B1* | 1/2009 | Radhakrishnan et al. | 370/338 |
| 2004/0209597 | A1* | 10/2004 | Myles et al. | 455/410 |
| 2004/0235455 | A1* | 11/2004 | Jiang | 455/411 |
| 2005/0086346 | A1 | 4/2005 | Meyer | |
| 2005/0282531 | A1* | 12/2005 | Andreasson | 455/418 |
| 2006/0007920 | A1* | 1/2006 | Michel et al. | 370/352 |
| 2006/0203774 | A1* | 9/2006 | Carrion-Rodrigo | 370/331 |
| 2007/0021112 | A1* | 1/2007 | Byrne et al. | 455/419 |
| 2007/0155384 | A1* | 7/2007 | Haran et al. | 455/434 |

FOREIGN PATENT DOCUMENTS

KR     2005-0050794     6/2005

OTHER PUBLICATIONS

International Search Report for International Application No. PCT/US2007/064734 issued by the Korean Patent Office on Aug. 17, 2007, 4 pgs.

* cited by examiner

*Primary Examiner*—Rafael Pérez-Gutiérrez
*Assistant Examiner*—Liton Miah
(74) *Attorney, Agent, or Firm*—Schwabe, Williamson & Wyatt, P.C.

(57) ABSTRACT

Embodiments of methods and apparatus for providing an access profile system associated with a broadband wireless access network are generally described herein. Other embodiments may be described and claimed.

22 Claims, 6 Drawing Sheets

METHODS AND APPARATUS FOR PROVIDING AN ACCESS PROFILE SYSTEM ASSOCIATED WITH A BROADBAND WIRELESS ACCESS NETWORK

TECHNICAL FIELD

The present disclosure relates generally to wireless communication systems, and more particularly, to methods and apparatus for providing an access profile system associated with a broadband wireless access network.

BACKGROUND

As wireless communication becomes more and more popular, the demand for broadband wireless access has dramatically increased. The 802.16 family of standards were developed by the Institute of Electrical and Electronic Engineers (IEEE) to provide for fixed, portable, and/or mobile broadband wireless access networks such as the IEEE std. 802.16-2004 (published Sep. 18, 2004), the IEEE std. 802.16e (published Feb. 28, 2006), etc. The Worldwide Interoperability for Microwave Access (WiMAX) Forum facilitates the deployment of broadband wireless networks based on the IEEE 802.16 standards. In particular, the WiMAX Forum ensures the compatibility and inter-operability of broadband wireless equipment. For convenience, the terms "802.16" and "WiMAX" may be used interchangeably throughout this disclosure to refer to the IEEE 802.16 suite of air interface standards.

WiMAX is a wireless technology to deliver last-mile broadband connectivity in a larger geographical area than other wireless technology such as Wireless Fidelity (Wi-Fi). In particular, WiMAX technology may provide broadband or high-speed data connection to various geographical locations where wired transmission may be too costly, inconvenient, and/or unavailable. In one example, WiMAX technology may offer greater range and bandwidth to enable T1-type service to businesses and/or cable/digital subscriber line (DSL)-equivalent access to homes.

DETAILED DESCRIPTION

In general, methods and apparatus for providing an access profile system associated with a broadband wireless access (BWA) network are described herein. The methods and apparatus described herein are not limited in this regard.

Figure 1:
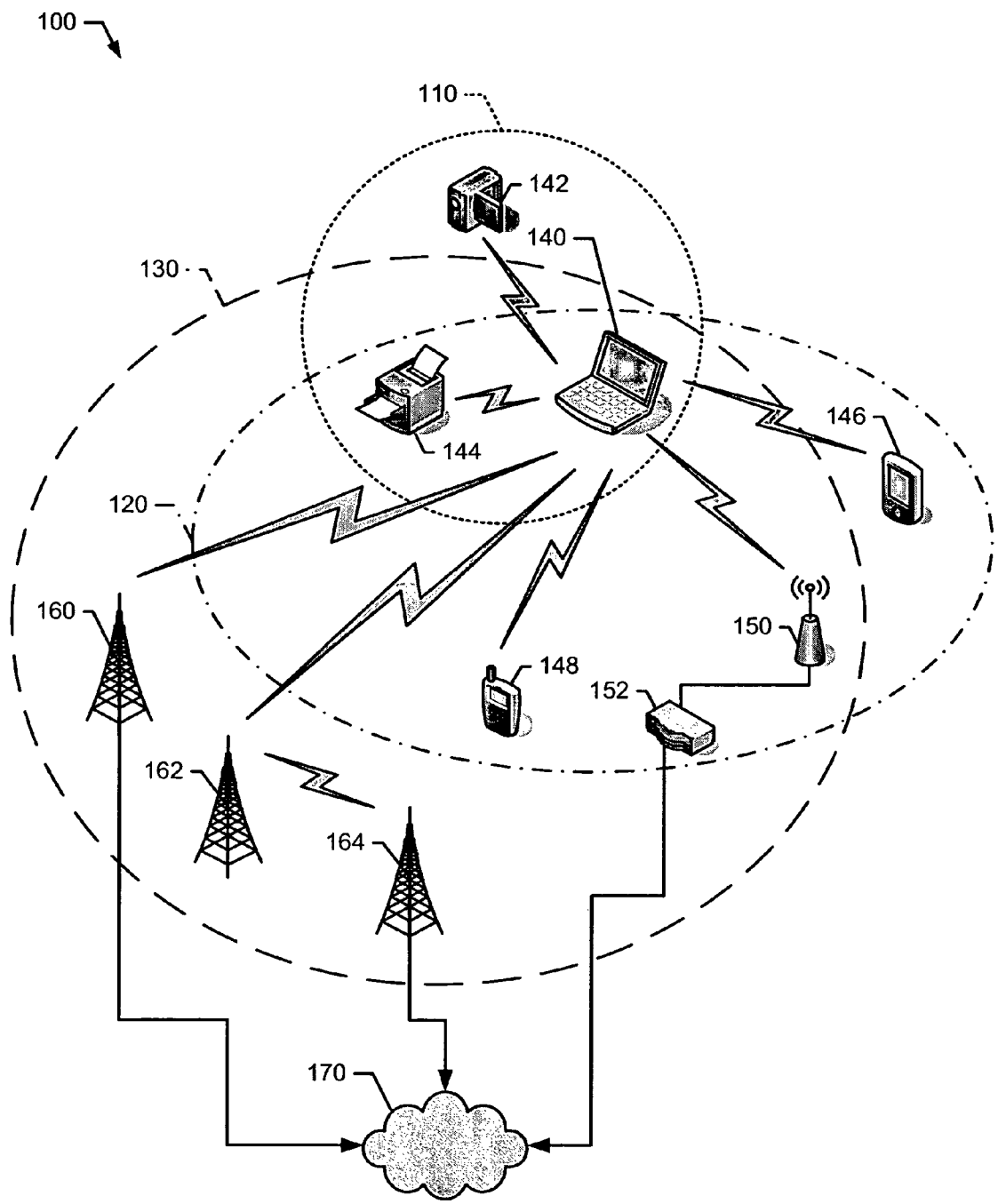
FIG. 1 is a schematic diagram representation of an example wireless communication system according to an embodiment of the methods and apparatus disclosed herein.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), a set-top box, and/or other suitable relatively stationary, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), orthogonal frequency division multiple access (OFDMA), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004, the IEEE std. 802.16e, etc.) to communicate with base stations, generally shown as 160, 162, and 164, via wireless link(s).

Although some of the above examples are described above with respect, to standards developed by IEEE, the methods and apparatus disclosed herein are readily applicable to many specifications and/or standards developed by other special interest groups and/or standard development organizations (e.g., Wireless Fidelity (Wi-Fi) Alliance, WiMAX Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. Further, the wireless communication system 100 may include a wireless mesh network. Although FIG. 1 depicts a WPAN, a WLAN, and a WMAN, the wireless communication system 100 may include other combinations of WPANs, WLANs, WMANs, WWANs, and/or mesh networks. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
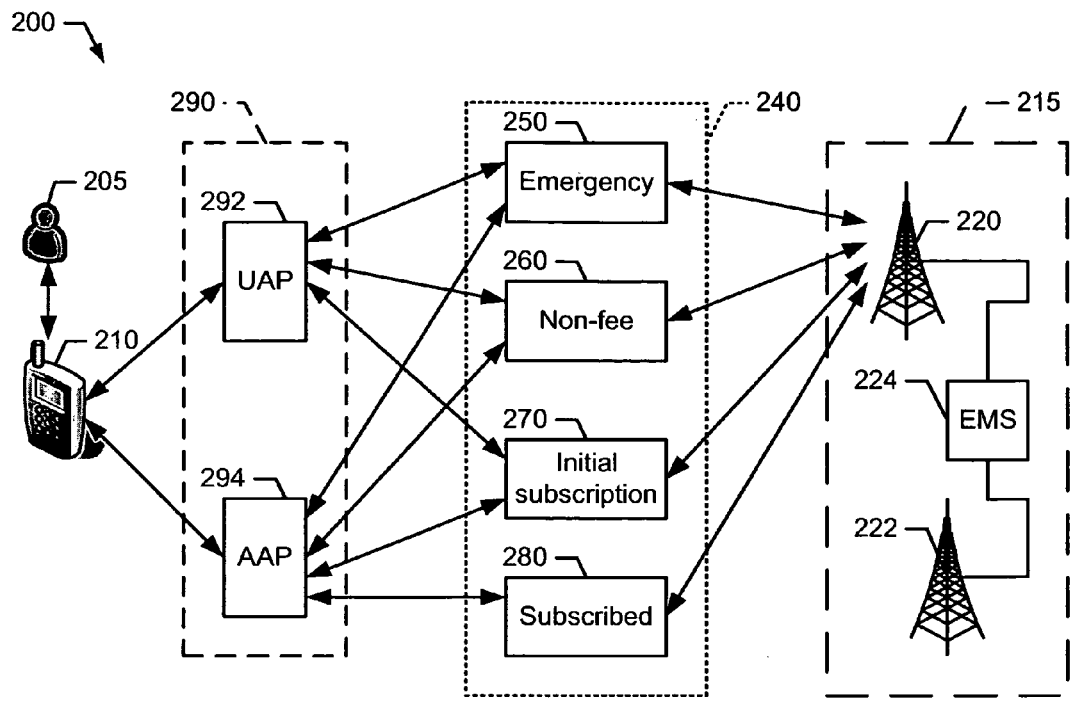
FIG. 2 depicts an example access profile system associated with a broadband wireless access network.

In the example of FIG. 2, an access profile system 200 may include one or more users, generally shown as 205, carrying and/or using one or more wireless devices, generally shown as 210. In one example, the access profile system 200 may be implemented in accordance with a BWA-network 215. For example, the BWA network 215 may be a WWAN based on WiMAX technology and/or other suitable wireless packet-based networks (e.g., a WMAN).

Although FIG. 2 depicts a cellular telephone, the wireless device 210 may be a desktop computer, a laptop computer, a handheld computer, a tablet computer, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), a set-top box, other suitable relatively stationary, portable, or mobile electronic devices, and/or a combination thereof. The wireless device 210 may be communicatively coupled to one or more base stations, generally shown as 220 and 222, via one or more wireless links.

The base stations 220 and 222 may be operatively coupled to each other and/or other base stations via an element management system (EMS) 224. Although FIG. 2 depicts two base stations, the BWA network 215 may include more or less base stations. One or more service providers (not shown) of the BWA network 215 may offer a variety of network services 240 such as, for example, emergency services 250, non-fee based services 260, initial subscription services 270, subscribed services 280, and/or other suitable network services to the wireless device 210.

In general, the base station 220 may generate one or more access profiles associated with the user 205 and/or the wireless device 210, generally shown as 290, to access one or more of the network services 240. The base station 220 may download the access profile 290 to the wireless device 210. The access profile 290 may describe or indicate one or more of the network services 240 accessible by the wireless device 210. In particular, the access profile 290 may include packet classification information (e.g., destination Internet Protocol (IP) addresses and/or protocol types), application layer classification information, and/or other suitable information for the wireless device 210 and/or the base station 220 to establish one or more packet filters. As a result, the wireless device 210 and/or the base station 220 may determine whether to permit network traffic to and/or from the wireless device 210 based on the packet filter(s).

In one example, the base station 220 may generate either an unauthenticated access profile (UAP) 292 or an authenticated access profile (AAP) 294. With the unauthenticated access profile 292, the service provider(s) of the access profile system 200 may provide access to the network services 240 but without authentication of the user 205 and/or the wireless device 210. For example, the wireless device 210 may access network resources associated with emergency services 250, non-fee based services 260, and/or initial subscription services 270 but not subscribed services 280 with the unauthenticated access profile 292. In contrast to the unauthenticated access profile 292, the authenticated access profile 294 may provide unlimited access or relatively more access to the network services 240 than the unauthenticated access profile 294 to the wireless device 210. For example, the wireless device 210 may access network resources associated with emergency services 250, non-fee based services 260, initial subscription services 270, and subscribed services 280 with the authenticated access profile 294. As a result, the unauthenticated access profile 292 may have limited access to the network services 240 relative to the authenticated access profile 294.

The access profile 290 may provide the wireless device 210 and/or the base station 220 with one or more classification rules to establish packet filter(s). The classification rule(s) may indicate whether the wireless device 210 may access network resources associated with one or more of the network services 240. In one example, the classification rule(s) of the unauthenticated access profile 292 may limit access of the wireless device 210 to only emergency services 250. As a result, the wireless device 210 may reduce network traffic by only allowing requests to access network resources associated with emergency services 250. In another example, the classification rule(s) of the unauthenticated access profile 292 may limit access of the wireless device 210 to emergency services 250, non-fee based services 260, and initial subscription services 270.

Further, the access profile 290 may be dynamic such that the service provider (e.g., via a network operator) may change the access profile 290 from the unauthenticated access profile 292 to the authenticated access profile 294 or vice versa. The access profile 290 may also be distributed by the EMS 224 to other base stations (e.g., the base station 222) and/or other networks. In one example, the EMS 224 may provide the access profile 290 to the base station 222 prior to and/or during a handover process of a connection between the wireless device 210 and the base station 220. As a result, the base station 222 may establish one or more packet filters based on the classification rule(s) of the access profile 290. The methods and apparatus described herein are not limited in this regard.

Figure 3:
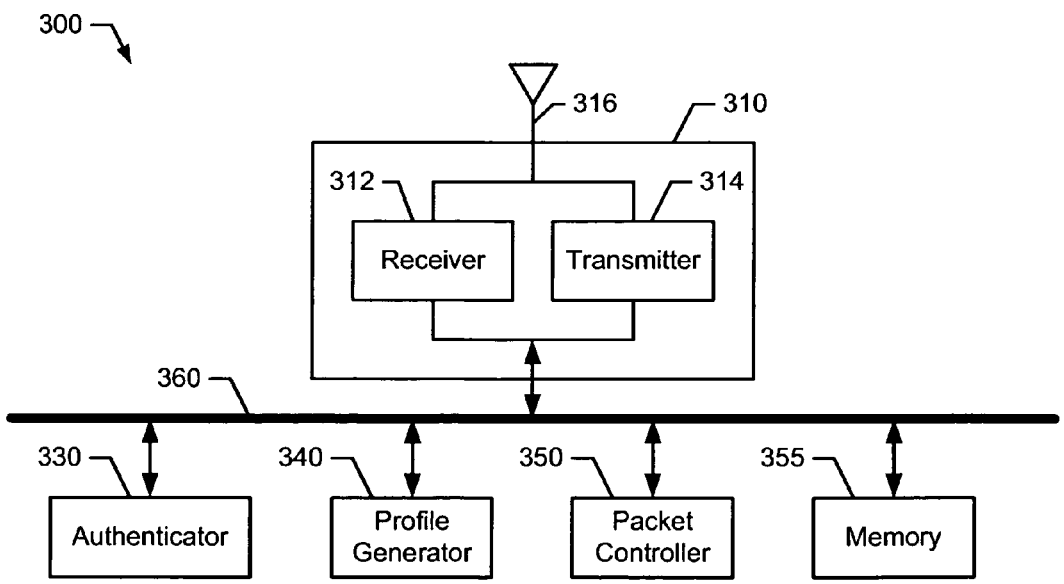
FIG. 3 depicts an example base station of the example access profile system of FIG. 2.

Referring to FIG. 3, for example, a base station 300 may include a communication interface 310, an authenticator 330, a profile generator 340, a packet controller 350, and a memory 355. In one example, the base station 300 may be the base station 220 of FIG. 2. Although FIG. 3 depicts components of the base station 300 coupling to each other via a bus 360, these components may be operatively coupled to each other via other suitable direct or indirect connections (e.g., a point-to-point connection or a point-to-multiple point connection).

While FIG. 3 depicts particular components, the base station 300 may include other suitable components to operate within a wireless communication network. Further, although the components shown in FIG. 3 are depicted as separate blocks within the base station 300, the functions performed by some of these blocks may be integrated within a single semiconductor circuit or may be implemented using two or more separate integrated circuits. For example, although the receiver 312 and the transmitter 314 are depicted as separate blocks within the communication interface 310, the receiver 312 may be integrated into the transmitter 314 (e.g., a transceiver). In another example, while the authenticator 330 is depicted as a block located within the base station 300, the authenticator 330 may be located in an EMS (e.g., the EMS 224 of FIG. 2).

Briefly, the communication interface 310 (e.g., a radio-frequency (RF) physical-layer (PHY) sub-system) may include a receiver 312, a transmitter 314, and an antenna 316. The communication interface 310 may receive and/or transmit data via the receiver 312 and the transmitter 314, respectively. The antenna 316 may include one or more directional or omni-directional antennas such as dipole antennas, monopole antennas, patch antennas, loop antennas, microstrip antennas, and/or other types of antennas suitable for transmission of RF signals. Although FIG. 3 depicts a single antenna, the base station 300 may include additional antennas. For example, the base station 300 may include a plurality of antennas to implement a multiple-input-multiple-output (MIMO) system.

As described in further detail below, the authenticator 330 may authenticate at least one user entity associated with a wireless device (e.g., the wireless device 210 of FIG. 2). Also referring to FIG. 2, for example, the authenticator 330 may authenticate the user 205 of the wireless device 210, the wireless device 210 itself, or both the user 205 and the wireless device 210. Based on whether the user entity is authenticated by the authenticator 330, the profile generator 340 may generate a corresponding access profile (e.g., the access profile 290 of FIG. 2). In one example, the profile generator 340 may generate an unauthenticated access profile (e.g., the unauthenticated access profile 292 of FIG. 2) if the authenticator 330 fails to authenticate the user 205, the wireless device 210, or both the user 205 and the wireless device 210. In another example, the profile generator 340 may generate an authenticated access profile (e.g., the authenticated access profile 294 of FIG. 2) if the authenticator 330 authenticates the user 205 (FIG. 2), the wireless device 210 (FIG. 2), or both the user 205 and the wireless device 210. The base station 220 (e.g., via the communication interface 310 of FIG. 3) may provide the access profile 290 to the wireless device 210. As noted above, the access profile 290 may include one or more classification rules. Accordingly, the packet controller 350 may determine whether an incoming or outgoing packet conforms to the classification rule(s). The memory 355 may store information such as the access profile 290. The methods and apparatus described herein are not limited in this regard.

Although FIG. 3 depicts a base station of the access profile system 200, the wireless device 210 may include one or more components shown in FIG. 3. In particular, the wireless device 210 may include a communication interface (e.g., the communication interface 310) and a packet controller (e.g., the packet controller 350). Accordingly, the wireless device 210 may receive the access profile 290 from the base station 220 and provide access to one or more of the network services 240 based on the access profile 290 as described in detail below.

FIGS. 4, 5, 6, and 7 depict manners in which the example wireless device 210 and the base station 220 may be configured to provide an access profile system. The example processes 400, 500, and 600 of FIGS. 4, 5, and 6, respectively, may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Figure 4:
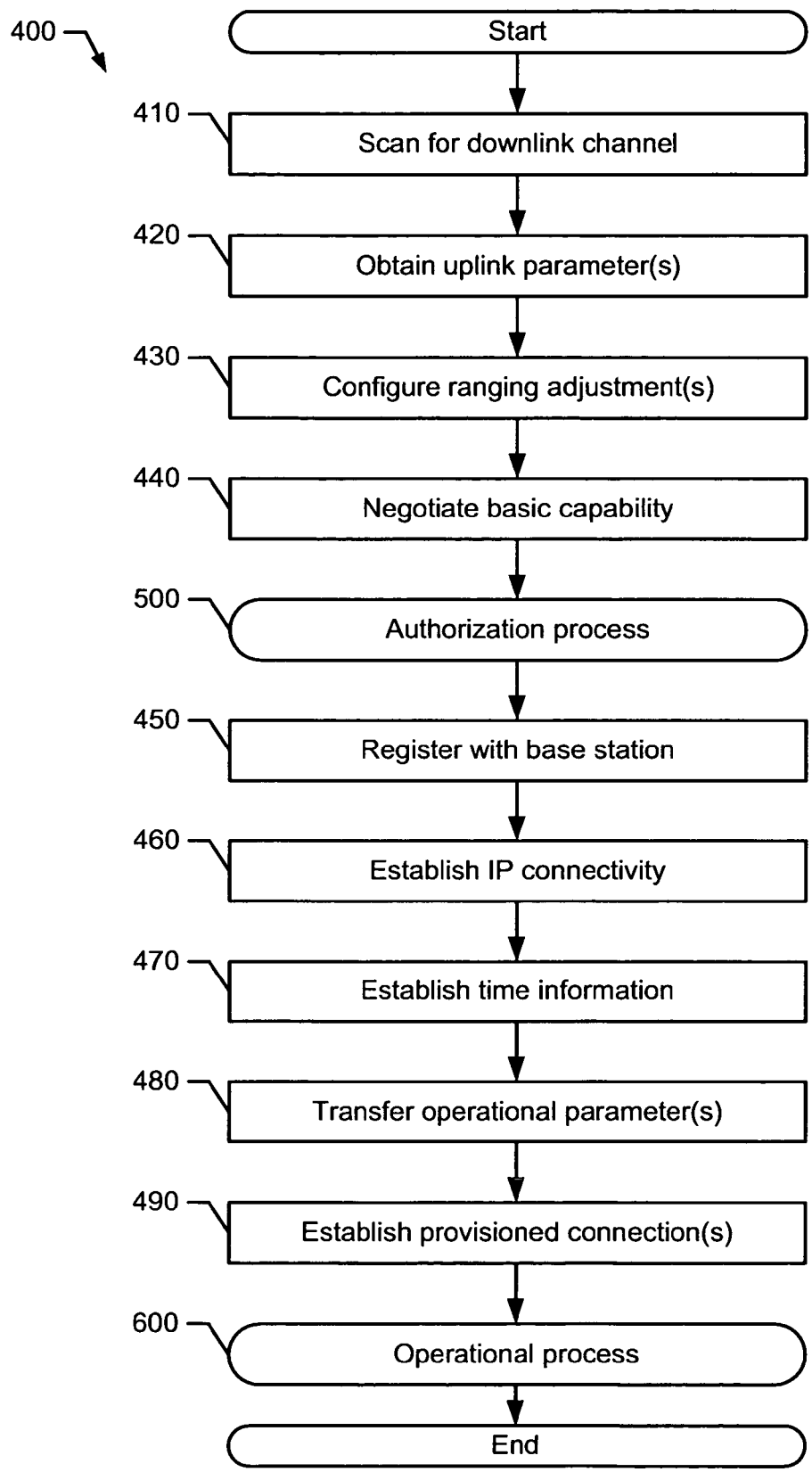
FIG. 4 is a flow diagram representation of one manner in which the example wireless device of FIG. 2 may be configured to access one or more network services.
Figure 5:
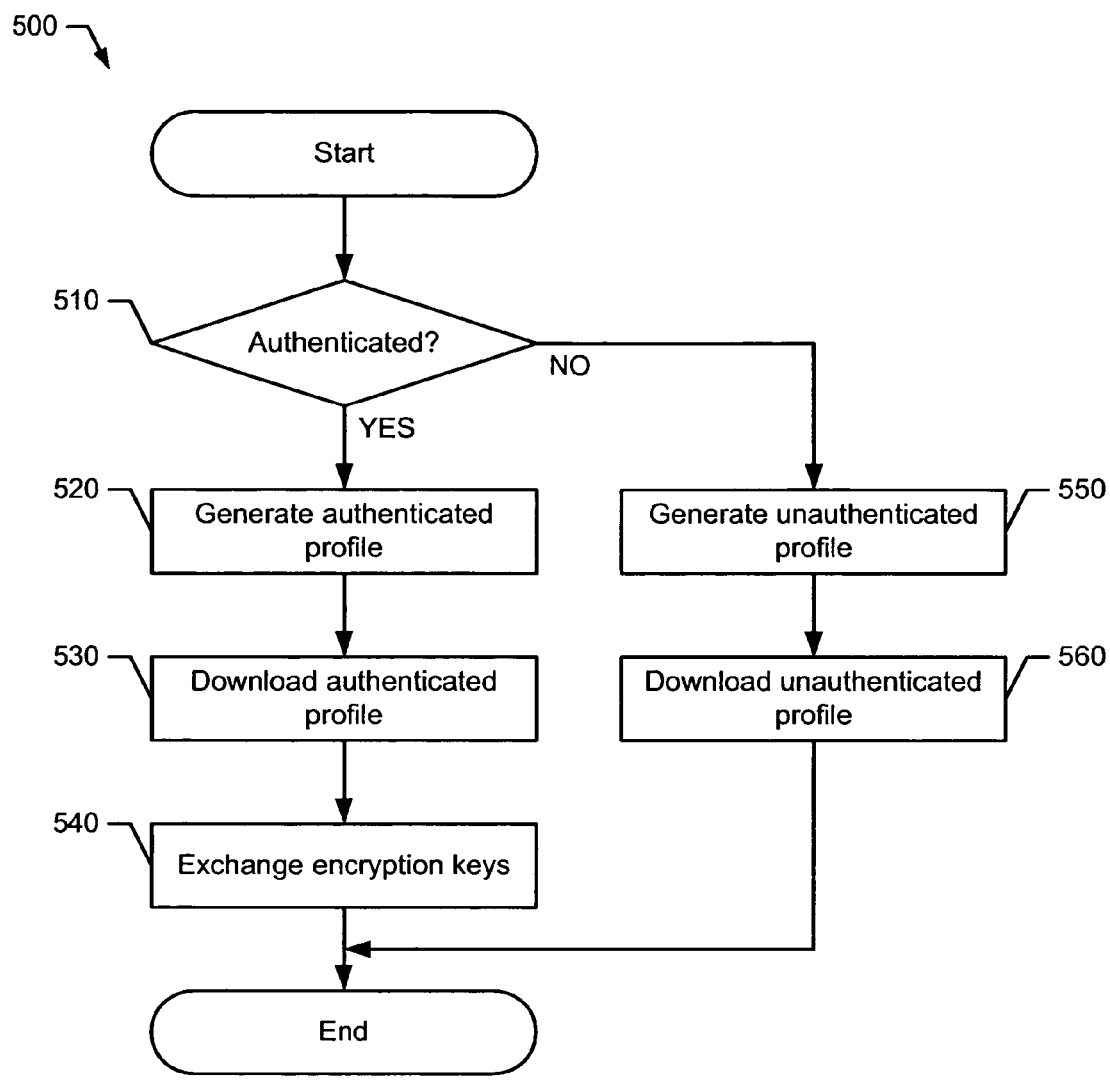
FIG. 5 is a flow diagram representation of one manner in which the example base station of FIG. 3 may be configured to execute an authorization process.
Figure 6:
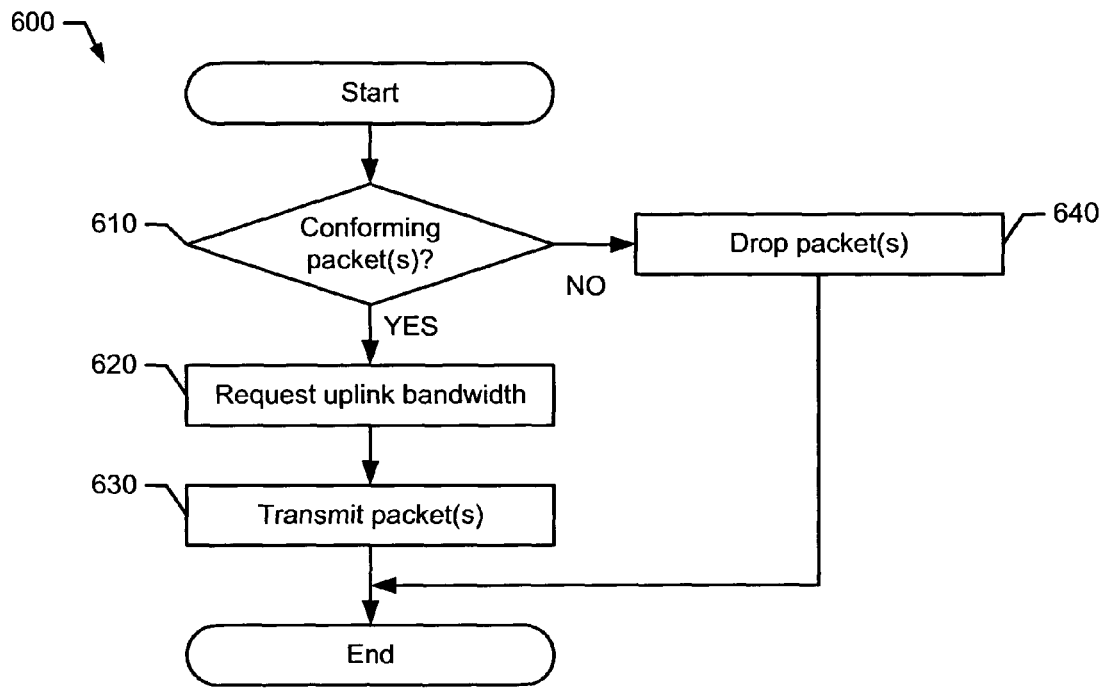
FIG. 6 is a flow diagram representation of one manner in which the example wireless device of FIG. 2 may be configured to execute an operational process.

In addition, although FIGS. 4, 5, and 6 depict particular orders of actions, these actions may be performed in other temporal sequences. Further, while FIGS. 4, 5, and 6 depict particular example processes to provide an access profile system, the processes 400, 500, and/or 600 may be performed without certain blocks. Again, the example processes 400, 500, and 600 are merely provided and described in conjunction with the system of FIG. 2 and/or the apparatus of FIG. 3 as an example of one way to provide an access profile system.

As noted above, the access profile system 200 may be implemented in accordance with a BWA network based on WiMAX technology. In one example, the access profile system 200 may operate in accordance with the IEEE std. 802.16-2004. Referring to FIG. 4, for example, the process 400 may begin with the wireless device 210 entering and registering with the BWA network 215 by scanning for a downlink channel and synchronizing with the base station 220 (block 410). For example, the wireless device 210 may scan for a downlink channel during initialization (e.g., power up) or after signal loss. After synchronizing with the base station 220, the wireless device 210 may retrieve one or more transmission parameters associated with an uplink channel (block 420). In one example, the wireless device 210 may monitor for an uplink channel descriptor (UCD) message including uplink channel information that is periodically transmitted by the base station 220. The wireless device 210 may configure one or more ranging adjustments (e.g., timing offset and/or power adjustments) to communicate with the base station 220 (block 430). The wireless device 210 may also negotiate basic capability by transmitting a message including capability information to the base station 220 (block 440).

To provide access of network resources associated with one or more network services 240, the base station 220 may authenticate a user entity (e.g., the user 205, the wireless device 210 itself, or both the user 205 and the wireless device 210). Accordingly, the base station 220 may perform an authorization process 500 of FIG. 5. In the example of FIG. 5, the base station 220 (e.g., via the authenticator 330) may determine whether a user entity of the wireless device 210 (e.g., the user 205) is authenticated (block 510). In particular, the user 205 may enter log in information (e.g., user identifier and/or password).

Alternatively, the base station 220 may determine whether the wireless device 210 is authenticated or whether both the user 205 and the wireless device 210 are authenticated. In one example, the user 205 may be authorized to access a particular network service (e.g., accessing checking account or downloading music, videos, etc.) but the wireless device 210 may not be an authorized device because the corresponding service provider may have a limit on the number of devices that the user 205 may use to access the particular network service. As a result, the user entity in the above example may not be authenticated as the particular network service requires both the user 205 and the wireless device 210 to be authenticated.

If the user entity of the wireless device 210 is authenticated at block 510, the base station 220 may generate an authenticated access profile (e.g., the authenticated access profile 294 of FIG. 2) (block 520). In one example, the user 205 may subscribe to one or more network services (e.g., Voice over IP (VoIP) services offered by a service provider of the BWA network 200. The base station 220 may automatically generate the authenticated access profile 294 if the user 205 has a subscription. Alternatively, the base station 220 may generate the authenticated access profile 294 if the user 205 inputs proper log in information to access one or more subscribed services 280. The base station 220 may download the authenticated access profile 294 to the wireless device 210 (block 530). Accordingly, the base station 220 may exchange encryption keys with the wireless device 210 to establish secure communication between the wireless device 210 and the base station 220 (block 540).

Otherwise if the user entity is not authenticated at block 510, the base station 220 may generate an unauthenticated access profile (e.g., the unauthenticated access profile 292 of FIG. 2) (block 550). The base station 220 may download the unauthenticated access profile 292 to the wireless device 210 (block 560). Based on the unauthenticated access profile 292, the base station 220 may establish one or more filters to allow particular network service(s) 240 (e.g., limited network services) for the wireless device 210. In one example, the service provider of the BWA network 215 may provide emergency services 250 to the wireless device 210 with the unauthenticated access profile 292. As a result, for example, the user 205 may use the wireless device 210 to access network resources of the BWA network 215 to contact the police department, fire department, and/or other authorities in case of an emergency even without being authenticated.

Turning back to FIG. 4, the wireless device 210 may register with the base station 220 (block 450). Accordingly, the base station 220 may manage the wireless device 210. The wireless device 210 may establish Internet Protocol (IP) connectivity with the base station 220 (block 460). To establish IP connectivity, for example, the wireless device 210 may invoke dynamic host configuration protocol (DHCP) to obtain an IP address and other suitable parameters. The wireless device 210 may also establish time information (e.g., current date and time) with the base station 220 (block 470). Briefly, the time information may be used for retrieval of time-stamping logged events.

The wireless device 210 may transfer one or more operational parameters to the base station 210 (block 480). In one example, the wireless device 210 may download a configuration file associated with the wireless device 210 to the base station 220. To communicate with the base station 220, the wireless device 210 may establish one or more provisioned connections with the base station 220 (block 490). In particular, the base station 220 may download the access profile 290 to the wireless device 210. The access profile 290 may include one or more classification rules. For example, the classification rule(s) may include one or more packet filters (e.g., one or more permitted packet field values). Accordingly, the wireless device 210 may access network resources of the BWA network 215 based on the classification rules as described in connection with FIG. 6. In one example, the classification rule(s) associated with the unauthenticated access profile 292 may limit the network resources that are accessible to the wireless device 210 whereas the classification rule(s) associated with the authenticated access profile 294 may authorize relatively greater access of the network resources to the wireless device 210 than access authorized by the classification rule(s) associated with the unauthenticated access profile 292.

In the example of FIG. 6, the process 600 may begin with the wireless device 210 determining whether one or more packets conform to the classification rule(s) associated with the access profile 290 (block 610). In one example, the wireless device 210 may determine whether the packet conforms to the classification rule(s) associated with the unauthenticated access profile 292. If the packet conforms to the classification rules associated with the unauthenticated access profile 292, the wireless device 210 may request for uplink bandwidth to transmit the packet (block 620). Accordingly, the wireless device 210 may transmit the packet to the base station 220 (block 630).

Otherwise if the packet does not conform to the classification rule(s) associated with the access profile 290 at block 610, the wireless device 210 may drop the packet (block 640). Accordingly, the wireless device 210 may not transmit the packet to the base station 220. The access profile system 200 may prevent an unauthenticated user entity (e.g., the user 205 and/or wireless device 210) from consuming network resources to request for network services that are not accessible to the unauthenticated user entity. In one example, the access profile system 200 may prevent unauthenticated user entities from maliciously requesting for network services to consume network resources and deny access of network services to authenticated user entities. As a result, network resources may be preserved for authenticated user entities to use. The methods and apparatus described herein are not limited in this regard.

Figure 7:
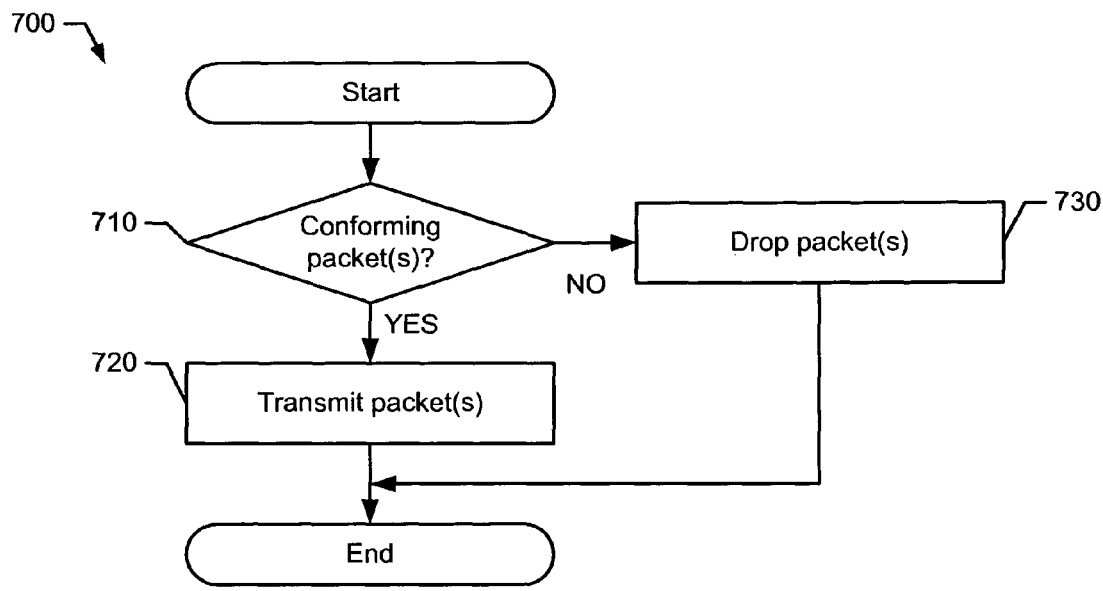
FIG. 7 is a flow diagram representation of one manner in which the example base station of FIG. 3 may be configured to execute an operational process.

Turning to FIG. 7, the process 700 may begin with the base station 220 (e.g., via the packet controller 350 determining whether one or more packets conform to the classification rule(s) associated with the access profile 290 (block 710). In one example, the packet controller 350 may determine whether the packet conforms to the classification rule(s) associated with the unauthenticated access profile 292. If the packet conforms to the classification rules associated with the unauthenticated access profile 292, the base station 220 (e.g., via the communication interface 310) may transmit the packet to the wireless device 210 (block 720). Otherwise if the packet does not conform to the classification rule(s) associated with the access profile 290 at block 710, the base station 220 may drop the packet (block 730). The methods and apparatus described herein are not limited in this regard.

While FIGS. 4, 5, 6, and 7 depict particular example processes associated with the access profile system 200, the methods and apparatus described herein may be performed without one or more blocks. As noted above, for example, the access profile system 200 may be implemented in a BWA network based on WiMAX technology. In one example, the methods and apparatus described herein may provide the access profile system 200 without certain blocks in FIG. 4 as the process 400 is merely an example of the access profile system 200 operating in accordance with the std. IEEE 802.16-2004. In another example, the process 600 may process one or more packets without block 620 because base stations based on WiMAX technology may schedule uplink transmissions without request from a wireless device. As a result, network resources used to communicate control channel capacity may be conserved. The methods and apparatus described herein are not limited in this regard.

Although the methods and apparatus disclosed herein are described with respect to a BWA network, the methods and apparatus disclosed herein may be applied to other suitable types of wireless communication networks. For example, the methods and apparatus disclosed herein may be readily applicable to WPANs, WLANs, WMANs, WWANs, and/or mesh networks.

Figure 8:
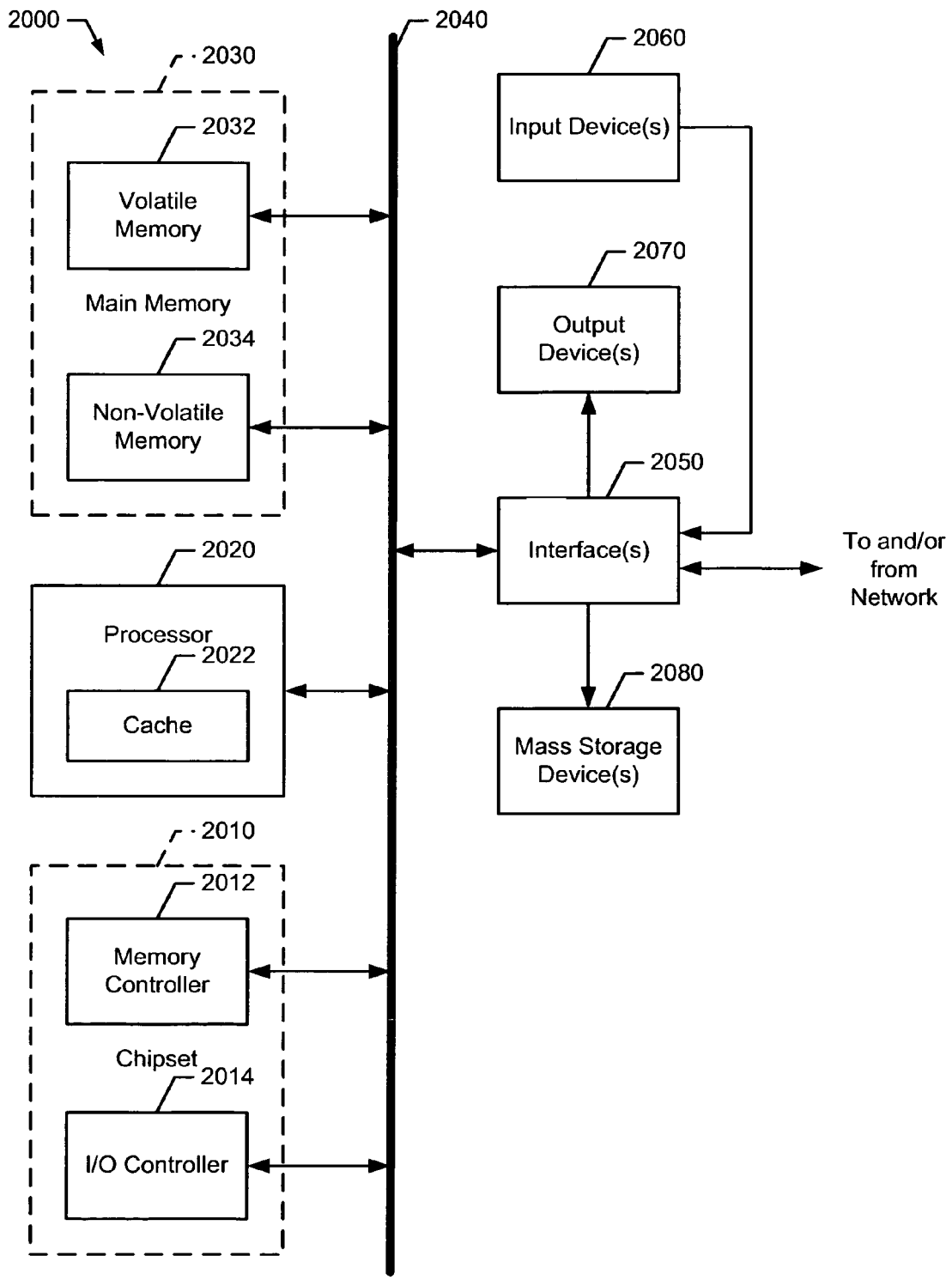
FIG. 8 is a block diagram representation of an example processor system that may be used to implement the example base station of FIG. 3.

FIG. 8 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 8 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WPAN components, WLAN components, WMAN components, WWAN components, and/or other suitable processing components. For example, the processor 2020 may be implemented using one or more of the Intel® Core™ technology, Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include one or more communication devices such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 8 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   determining that a wireless device in a packet-based network is an unauthenticated wireless device based upon a failed authentication process;
   establishing a data-bearing path with the unauthenticated wireless device;
   generating an access profile associated with a user of the unauthenticated wireless device, wherein the access profile includes one or more classification rules to establish one or more packet filters;
   transmitting the access profile to the unauthenticated wireless device in the packet-based network, wherein the access profile is configured to prevent the unauthenticated wireless device from transmitting one or more requests for network services, over the data-bearing path, that are unavailable to unauthenticated wireless devices; and
   providing access of a subset of the network services associated with the packet-based network to the unauthenticated wireless device over the data-bearing path based on the access profile.

2. A method as defined in claim 1, wherein generating the access profile comprises generating an unauthenticated access profile in response to the determining.

3. A method as defined in claim 1, wherein generating the access profile comprises generating the access profile based on at least one of destination Internet Protocol (IP) address information, protocol type information, or application layer classification information.

4. A method as defined in claim 1, wherein generating the access profile comprises generating the access profile in a wireless communication network based on Worldwide Interoperability for Microwave Access (WiMAX) technology.

5. A method as defined in claim 1, wherein providing access of the subset of network services comprises providing access of at least one of an emergency service, a non-fee based service, or an initial subscription service based on an unauthenticated access profile.

6. A method as defined in claim 1, wherein providing access of the one or more network services comprises controlling one or more packets based on one or more classification rules associated with an unauthenticated access profile, the one or more classification rules being generated by a base station of the packet-based network.

7. A method as defined in claim 1, wherein said providing access comprises providing access of emergency services over the data-bearing path based on the access profile.

8. A method comprising:
   establishing, by an unauthenticated wireless device, a connection with a network access node of a packet-based network in response to a failed authentication with the network access node;
   receiving, by the unauthenticated wireless device, an access profile associated with a user of the unauthenticated wireless device, wherein the access profile includes one or more classification rules to establish one or more packet filters, the one or more packet filters configured to regulate transmission of one or more packets associated with a request for network services;
   preventing, by the unauthenticated wireless device, the transmission of the one or more packets associated with the request for network services based on the one or more packet filters, wherein the network services are unavailable to unauthenticated wireless devices; and
   accessing, by the unauthenticated wireless device, a subset of the network services associated with the packet-based network over the connection based on the access profile.

9. A method as defined in claim 8 wherein receiving the access profile comprises receiving one or more classification rules associated with an unauthenticated access profile to the unauthenticated wireless device, the one or more classification rules being generated by the network access node of the packet-based network.

10. A method as defined in claim 8 wherein accessing the subset of the network services comprises accessing at least one of an emergency service, a non-fee based service, or an initial subscription service based on an unauthenticated access profile.

11. An article of manufacture, comprising:
    a machine accessible medium including content, which when accessed, causes a machine to:
    determine that a wireless device in a packet-based network is an unauthenticated wireless device based upon a failed authentication process;
    establish a data-bearing path with the unauthenticated wireless device;
    generate an access profile associated with a user of the unauthenticated wireless device, wherein the access profile includes one or more classification rules to establish one or more packet filters;
    transmit the access profile to the unauthenticated wireless device in the packet-based network, wherein the access profile is configured prevent the unauthenticated wireless device from transmitting one or more requests for network services, over the data-bearing path, that are unavailable to unauthenticated wireless devices; and
    provide access of a subset of the network services associated with the packet-based network to the unauthenticated wireless device over the data-bearing path based on the access profile.

12. An article of manufacture as defined in claim 11, wherein the content, when accessed, causes the machine to generate the access profile by generating an unauthenticated access profile in response to the determination that wireless device is an unauthenticated wireless device.

13. An article of manufacture as defined in claim 11, wherein the content, when accessed, causes the machine to generate the access profile by generating the access profile based on at least one of destination Internet Protocol (IP) address information, protocol type information, or application layer classification information.

14. An article of manufacture as defined in claim 11, wherein the content, when accessed, causes the machine to provide access of the subset of network services by providing access of at least one of an emergency service, a non-fee based service, or an initial subscription service based on an unauthenticated access profile.

15. An article of manufacture as defined in claim 11, wherein the content, when accessed, causes the machine to provide access to the subset of network services by controlling one or more packets based on one or more classification rules associated with an unauthenticated access profile, and wherein the one or more classification rules are generated by a base station of the packet-based network.

16. An article of manufacture as defined in claim 11, wherein the content, when accessed, causes the machine to authenticate at least one of the user or the wireless device.

17. An apparatus comprising:
 an authenticator configured to determine that a wireless device in a packet-based network is an unauthenticated wireless devices in response to a failed authentication process;
 a profile generator to generate an access profile associated with a user of the unauthenticated wireless device, wherein the access profile includes one or more classification rules to establish one or more packet filters;
 a communication interface coupled to the profile generator, to establish a data-bearing path with the unauthenticated wireless device in response to the failed authentication process and to transmit the access profile to the unauthenticated wireless device, wherein the access profile is configured to prevent the unauthenticated wireless device from transmitting one or more packets associated with a request for network services over the data-bearing path, wherein the network services are unavailable to unauthenticated wireless devices; and
 a packet controller operatively coupled the profile generator to provide access of a subset of the network services, over the data-bearing path, associated with the packet-based network to the unauthenticated wireless device based on the access profile.

18. An apparatus as defined in claim 17, wherein the profile generator is configured to generate an unauthenticated access profile in response to a failure to authenticate at least one of the user or the unauthenticated wireless device.

19. An apparatus as defined in claim 17, wherein the access profile comprises at least one of destination Internet Protocol (IP) address information, protocol type information, or application layer classification information.

20. An apparatus as defined in claim 17, wherein the packet controller is configured to provide access of at least one of an emergency service, a non-fee based service, or an initial subscription service based on an unauthenticated access profile.

21. An apparatus as defined in claim 17, wherein the packet controller is configured to control one or more packets based on one or more classification rules associated with an unauthenticated access profile, the one or more classification rules being generated by a base station of the packet-based network.

22. An apparatus as defined in claim 17 wherein the authenticator is operatively coupled to the profile generator to authenticate at least of the user or the wireless device.

* * * * *

UNITED STATES PATENT AND TRADEMARK OFFICE
CERTIFICATE OF CORRECTION

PATENT NO. : 7,756,509 B2 Page 1 of 1
APPLICATION NO. : 11/394492
DATED : July 13, 2010
INVENTOR(S) : Rajagopalan et al.

It is certified that error appears in the above-identified patent and that said Letters Patent is hereby corrected as shown below:

Claim 9, Column 12
Line 24, "...claim 8 wherein..." should read --...claim 8, wherein...--.

Claim 10, Column 12
Line 30, "...claim 8 wherein..." should read --...claim 8, wherein...--.

Claim 11, Column 12
Lines 48-49, "...wherein the access profile is configured prevent..." should read --...wherein the access profile is configured to prevent...--.

Claim 17, Column 13
Lines 19-20, "...an unauthenticated wireless devices..." should read --...an unauthenticated wireless device...--.

Claim 17, Column 14
Lines 5-6, "...a packet controller operatively coupled the profile generator..." should read --...a packet controller operatively coupled to the profile generator...--.

Claim 21, Column 14
Line 28, "...claim 17 wherein..." should read --...claim 17, wherein...--.

Claim 22, Column 14
Line 30, "...at least of the user or the wireless device." should read --...at least one of the user or the wireless device.--.

Signed and Sealed this

Twelfth Day of October, 2010

David J. Kappos
*Director of the United States Patent and Trademark Office*